UNITED STATES PATENT OFFICE.

JOHN WATEROUS, OF BROOKLYN, NEW YORK.

COMPOSITION OF MATTER TO BE USED FOR SEALING FRUIT-CANS, &c.

SPECIFICATION forming part of Letters Patent No. 288,525, dated November 13, 188?.

Application filed September 20, 1883. (No specimens.)

*To all whom it may concern:*

Be it known that I, JOHN WATEROUS, of the city of Brooklyn, in the county of Kings and State of New York, have invented a new and useful Improvement in the Composition of Matter to be Used for Sealing Fruit-Cans, &c., of which the following is a full, clear, and exact description.

My composition consists of the following ingredients, combined in about the proportions stated, viz: resin, one hundred and twenty pounds; tallow, eight pounds; steatite, ten pounds. These ingredients are to be thoroughly mixed by first melting and heating the resin, and then adding the tallow. When the tallow shall have become melted in the resin, the steatite is added, and the whole mass is then thoroughly agitated, after which the mixture is poured into molds to cool for use for sealing fruit and other cans, or applied to strings to be used for sealing purposes, the strings being drawn slowly through the mass while in a semi-molten state. The addition of the steatite to the composition makes it spongy and tough, so that when cold it will not crumble and scale off, and at the same time the steatite destroys the sticky qualities of the composition, thus making it agreeable to handle.

Having thus described my invention, what I claim as new, and desire to secure by Letters Patent, is—

The herein-described composition of matter, consisting of resin, tallow, and steatite, combined in about the proportions stated.

JOHN WATEROUS.

Witnesses:
    H. A. WEST,
    C. SEDGWICK.